United States Patent
Koide et al.

(10) Patent No.: US 7,462,388 B2
(45) Date of Patent: *Dec. 9, 2008

(54) CONDUCTIVE RESIN MOLDED PRODUCT HAVING INSULATING SKIN AND METHOD FOR FORMING THE SAME

(75) Inventors: Atsushi Koide, Nagano-ken (JP); Yoshitoshi Yamagiwa, Nagano-ken (JP); Masashi Suganuma, Nagano-ken (JP); Yoshihiko Takahashi, Nagano-ken (JP)

(73) Assignee: Nissei Plastic Industrial Co., Ltd., Nagano-ken (JP)

( * ) Notice: Subject to any disclaimer, the term of this patent is extended or adjusted under 35 U.S.C. 154(b) by 717 days.

This patent is subject to a terminal disclaimer.

(21) Appl. No.: 10/722,116

(22) Filed: Nov. 25, 2003

(65) Prior Publication Data

US 2004/0131841 A1    Jul. 8, 2004

(30) Foreign Application Priority Data

Nov. 29, 2002   (JP)   ............................. 2002-347673

(51) Int. Cl.
*B32B 3/02*   (2006.01)
*A61M 25/00*   (2006.01)

(52) U.S. Cl. ............................ 428/323; 428/76; 264/478
(58) Field of Classification Search ...................... None
See application file for complete search history.

(56) References Cited

U.S. PATENT DOCUMENTS

| 6,180,275 | B1 | 1/2001 | Braun et al. |
| 6,599,446 | B1 * | 7/2003 | Todt et al. .................... 252/511 |
| 6,874,563 | B2 * | 4/2005 | Koide et al. .................... 164/97 |
| 2002/0172789 | A1 | 11/2002 | Watson et al. ............ 428/36.91 |

FOREIGN PATENT DOCUMENTS

| JP | 07-102112 | 4/1995 |
| JP | 2004-148634 | 5/2004 |

* cited by examiner

*Primary Examiner*—Sheeba Ahmed
(74) *Attorney, Agent, or Firm*—Weingarten, Schurgin, Gagnebin & Lebovici LLP

(57) ABSTRACT

The present invention relates to a conductive resin molded product having an insulating skin produced by a composite comprising a non-conductive resin and conductive material. The invention also provides a method for producing the conductive resin molded product.

2 Claims, 1 Drawing Sheet

CONDUCTIVE RESIN MOLDED PRODUCT HAVING INSULATING SKIN AND METHOD FOR FORMING THE SAME

This application claims priority to a Japanese patent application No. 2002-347673 filed Nov. 29, 2002.

BACKGROUND OF THE INVENTION

1. Field of the Invention

The present invention relates to a conductive resin molded product having an insulating skin produced by a composite consisting of nonconductive resin and conductive material, and relates to a method for producing the same.

2. Detailed Description of the Prior Art

According to a conventional method, nonconductive resin is blended with conductive material such as carbon black and carbon fiber, or metal powder and metal fiber and the composite is then molded to produce a conductive resin molded product. (For example, refer to Non-patent literature 1 below).

Moreover, some conductive molded products are produced by injection-filling a mold with conductive resin in which a conductive compounding material such as metal fiber or metal powder is blended with nonconductive resin. (For example, refer to Patent literature 1 below).

Non-patent literature 1: Ebihara, "Handbook of New Polymer Materials" P. 69 to 74, Maruzen Co., Ltd. September 20, 1989.

Patent literature 1: The Japanese Patent Laid-Open No. 1993-131445, P. 5.

Conventionally, a conductive resin molded product has been produced by blending a conductive compounding material with a nonconductive resin to provide a resin with conductivity. However, as described in Non-patent literature 1 and Patent literature 1, most of the conventional conductive resins have adopted carbon black, carbon fiber, metal powder, or metal fiber which has remarkably large particles compared with the molecules of the resin as the conductive compounding material. When such conductive compounding material is blended to the extent that the resin is able to have conductivity, the molded product has conductivity even on its surface; therefore, insulation treatment of the surface is necessary depending on its use.

Moreover, the shape of the molded product tends to be restricted since the properties of the resin such as lightweight, flexibility, moldability, and processability are deteriorated, causing a hindrance in the production of the molded product by injection molding and lowering mechanical strength and the like. As a result, there is a problem in adopting the above-mentioned technique to a product with a complex shape, even when used as a magnetic wave shield material.

SUMMARY OF THE INVENTION

The present invention is devised in order to solve the problems of the conventional conductive resin molded product as mentioned above. The purpose of the present invention is to expand the use of the conductive resin molded product and to provide a new conductive resin molded product having a new insulating skin which is usable as a base material for parts of electronic equipment such as laminated connectors as well as a method for producing the conductive resin molded product. For this purpose, a carbon nano material is adopted as a conductive compounding material to make the surface of the conductive resin molded product nonconductive.

The conductive resin molded product for the above-mentioned purpose according to the present invention comprises a resin insulating skin and a conductive core covered with said skin and is composed of a composite containing a non-conductive resin and a carbon nano material. The resin insulating skin is obtainable from molding said composite by controlling an amount of the carbon nano material to be composited with the non-conductive resin.

Moreover, a molding method for producing a conductive resin molded product according to the present invention comprises the steps of;

plasticizing a composite material containing a non-conductive resin and a carbon nano material; and injection molding thus plasticized material into a mold cavity to produce the conductive resin molded product comprising a resin insulating skin and a conductive core covered with said skin. In the method, an amount of the carbon nano material to be composited with the non-conductive resin is controlled so as to form the resin insulating skin in contact with a cavity face during said injection molding.

A ratio of the carbon nano material to be composited with said non-conductive resin does not exceed 15 weight % based on the composite to form the resin insulating skin in contact with a cavity face during said injection molding.

DETAILED DESCRIPTION OF THE PREFERRED EMBODIMENT

Figure 1:
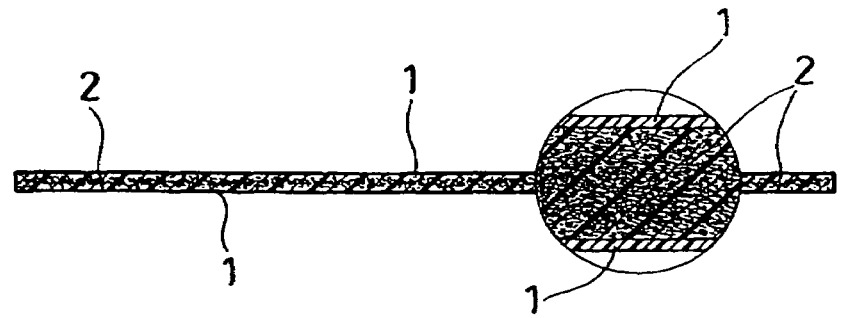
FIG. 1 is an enlarged cross sectional view of a part of a conductive resin molded product having an insulating skin according to the present invention.

FIG. 1 shows an enlarged cross sectional view of a part of a conductive resin plate mentioned as an example of the present invention. The reference numeral 1 is an insulating resin skin, and the reference numeral 2 a conductive core coated with the insulating skin 1. The conductive resin plate is obtained by injection molding a composite conductive material with which a carbon nano material is blended. It is a flat plate with a thickness of 1.5 to 3.0 mm and an upper face area of 30 to 40 cm$^2$, and consists of the insulating skin 1 with a thickness of 0.1 to 0.2 mm and the core 2 having conductivity brought by the carbon nano material inside of it. The surface of the conductive resin plate has an electrical resistance of $10^{10}$ Ωcm or more.

Even if the above-mentioned conductive resin plate is insulated by the surface resin, an end of a conductive part breaks through the insulating skin 1 and reaches the core 2 when the part sticks into the resin plate. Therefore, the part becomes electrically connected with the conductive core 2. Such a conductive resin plate can be used as an electromagnetic wave shield material since it has an insulating skin, and can also be used as a base material for a laminated connector. The conductive resin plate is also applicable to many other uses.

Since conductive core 2 is coated with insulating skin 1 in use as an electromagnetic wave shield material, it is unnecessary to take into account electric damage caused by contact with other electronic equipment, parts, or the like. Moreover, since the surface is made by resin, any surface treatment such as mirror finishing of the surface and embellishment is also easily carried out by a conventional treatment method employed for the resin previously.

Although an illustration is omitted here, the laminated connector can easily be manufactured by adhering a necessary number of stack sheets together into a laminated plate, cutting this at equal intervals into plate bodies in which the insulating skin and the conductive core are alternately placed, and only cutting the plate body to a necessary dimension in the direction orthogonal to the insulating skin. Thus, a connector constituted of the conductive cores of the number equal to the stacked sheets is formed into a laminated type connector divided by the insulating skins.

In a conventional laminated connector made of rubber, after a thin film of rubber provided with conductivity is alternately laminated with a thin film of insulating rubber and the two films are fixed together, the laminate is then cut to manufacture a rubber laminated connector. On the other hand, using the conductive resin molded product having insulating skin 1 eliminates the alternate lamination of the insulating skins, and the laminated plate is easily formed by mutual adhesion between the insulating skins. Therefore, manufacture is simpler than that using rubber, and a laminated type resin connector, which has been regarded as difficult to manufacture, can be provided at a lower cost.

Moreover, the carbon nano material is an ultrafine particulate and present in a blending quantity not exceeding 15 weight %. Since it does not damage the characteristics of the resin, injection molding can be performed under conditions set according to the resin. Special techniques are not required for molding and there is little change in properties. Therefore, the resin does not lose its characteristics in the molding process, and a conductive resin plate having further improved dimensional accuracy can be obtained as the base material for parts.

In order to produce the above-mentioned conductive resin plate by injection molding, a composite conductive material blending a carbon nano material, not exceeding 15 weight %, with a nonconductive resin is used. As the nonconductive resin, a thermoplastic resin used as a molding material, for example, polyethylene, polyester, polyamide, polycarbonate, ABS resin, and liquid crystal polymer can be used.

Moreover, as a carbon nano material to be blended with the nonconductive resin, nano fibers (having a diameter of 50-200 nm, preferably, 80-150 nm, and an aspect ratio of 100-1000), nano carbon tubes (having a diameter of 1-50 nm, preferably, 10-50 nm, and an aspect ratio of 100-1000), fullerene (having a diameter of 0.7-1 nm), or the like can be used. Since they are more ultrafine particulate than the metal powder and metal fiber which have been blended as the conductive material in previous composite conductive materials, they have good comformability to the resins, and have a good dispersion efficiency by kneading. As a result, the properties of the resins such as flexibility, moldability, and processability are not lost.

In the aforementioned case, it is most preferable that such composite conductive material is pelletized beforehand and supplied to an injection molding machine. However, there is no difficulty in the molding even if both of the resin and carbon nano material are sufficiently kneaded by a kneader and then supplied to the injection molding machine. Therefore, the composite conductive material may be supplied by either method.

The molding conditions of the injection molding machine such as temperature of a heating cylinder, cooling temperature of a product mold, screw speed, injection speed and pressure are arbitrarily set according to the kind of resin adopted there. After the composite conductive material supplied from a hopper into the heating cylinder with a built-in screw is plasticized (melted and kneaded) by ordinary injection molding operation, the material is measured and then filled by injection into the mold by forward stroke of the screw.

Figure 2:
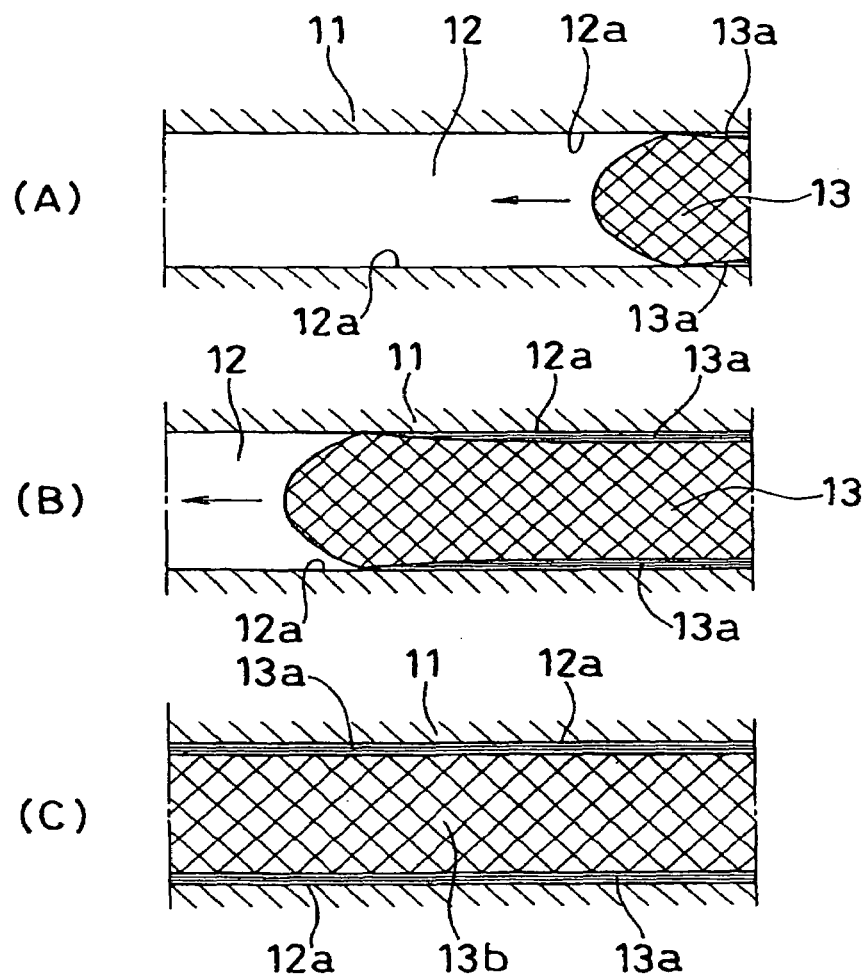
FIG. 2 is an explanatory illustration of behavior of a composite conductive material flowing in the cavity up to completion of the filling.

Each illustration in FIG. 2 shows the behavior of the molten body 13 of the composite conductive material flowing in the cavity 12 of the mold 11 before completing the filling, and as shown in the illustration (A), the molten body 13 flows at the highest speed in the center part, and flows slower as it approaches a cavity surface 12a. Moreover, as shown in the illustration (B), the molten body is increased in viscosity due to cooling of the mold 11, becomes resistant to flow, and the resin is cooled and solidified into the surface layer (the skin).

From this difference in flow, a velocity gradient, namely, a rate of shear arises between the center part of the molten body 13 and the contact part with the cavity surface 12a. Thus, the resin at the cavity surface 12a, which becomes cooled and solidified, is extended in the direction of the flow because of the large shearing stress applied on it from the molten body 13 being press-fitted. At the same time, the carbon nano material on the skin side is also pulled and aligned in the direction of the flow, and also becomes easily centralized in the center of the molten body away from the skin 13a.

On the other hand, since the core 13b is little influenced by the shearing stress and the carbon nano material exhibits anisotropy, conductivity appears. It is difficult to obtain conductivity by using fullerene, but an effect is obtained by using a carbon nano material together with fullerene. This phenomenon is conditional on the blending quantity of carbon nano material; the blending quantity is preferred to be 5-15 weight %. In the case of a blending quantity exceeding 15 weight %, conductivity appears also in the skin 13a, and this makes it difficult to form an insulating skin 13a out of the resin. After having completed filling the resin, the resin is cooled and solidified into the conductive resin plate comprising the skin 13a of the resin having non-conductivity and the conductive core 13b coated with the skin 13a as shown in the illustration. Namely, the insulating skin formed out of resin and the core coated with the insulating skin are formed by the difference in fluidity between the resin and the carbon nano material flowing in the cavity and shearing stress on the cavity surface obtained by controlling a blending quantity of a carbon nano material.

EXAMPLE OF THE EMBODIMENT

| Conductive resin molded product | |
|---|---|
| Form and dimensions; | Flat plate (rectangular shape), Plate thickness: 2.0 mm Plane area of its upper face: 36 cm$^2$ |
| Resin; | Polypropylene |
| Compounding ingredient; | Carbon nano tube, 10 nm diameter, 1 to 10 μm long |
| Blending quantity; | 10 weight % |
| Conductivity (volume resistivity); | Surface: $10^{10}$ Ωcm or more, Inside: $10^3$ Ωcm or less |
| Injection molding machine; | PS40 (manufactured by NISSEI PLASTIC INDUSTRIAL CO., LTD.) |
| Molding conditions; | Plasticizing temperature 210° C. Injection speed 100 mm/s Injection pressure 100 MPa Mold temperature 30° C. |

What is claimed is:
1. A conductive resin molded product comprising:
a resin insulating skin obtained from molding a composite containing a non-conductive resin and a carbon nano material by controlling an amount of the carbon nano material to be composited with the non-conductive resin; and a conductive core covered by said resin insulating skin, wherein a ratio of a carbon nano material to be composited with said non-conductive resin is less than about 15 weight percent based on the composite.

2. A molding method for producing a conductive resin molded product, said method comprising the steps of:

plasticizing a composite material containing a nonconductive resin and a carbon nano material; and injection molding thus plasticized material into a mold cavity to produce the conductive resin molded product comprising a resin insulating skin and a conductive core covered with said skin, an amount of the carbon nano material to be composited with the non-conductive resin being controlled so as to form the resin insulating skin in contact with a cavity face during said injection molding, wherein a ratio of a carbon nano material to be composited with said non-conductive resin is less than about 15 weight percent based on the composite.

* * * * *